Patented Mar. 14, 1944

2,344,124

UNITED STATES PATENT OFFICE 2,344,124

REFINING VITAMIN OILS

Loran O. Buxton, Belleville, and Louis T. Rosenberg, Ridgefield Park, N. J., assignors to National Oil Products Company, Harrison, N. J., a corporation of New Jersey No Drawing. Application December 13, 1941,
Serial No. 422,880

6 Claims. (Cl. 260—425)

This invention relates to a process of refining vitamin oils and in particular to the removal of undesirable color, odor and taste bodies and free fatty acids from fat-soluble vitamin-containing marine oils.

Heretofore, in the refining of fatty oils, the free fatty acids have been removed by various processes, the most common of which is known as the alkali refining process wherein the free fatty acids are saponified by means of an alkali. It has been found that when fat-soluble vitamin-containing marine oils are subjected to the so-called alkali refining process the resulting oil is invariably characterized by having a dark color and an undesirable taste and odor. Attempts have been made to remove the bodies which lend these undesirable characteristics to the refined oil by treating the oil with various adsorbents including activated carbon. These attempts have failed due to the fact that unrefined fat-soluble vitamin-containing marine oils contain colloid and/or suspended impurities which impart the undesirable odor, taste and dark color thereto. When such an oil is alkali refined at the outset to remove all of the free fatty acids, the alkali serves to solubilize the impurities in the oil, thereby fixing these undesirable impurities therein to the extent that activated carbon will not selectively adsorb the same.

Processes of removing the undesirable odor, taste and color bodies from fat-soluble vitamin-containing marine oils have also been devised. While such processes have been successful to a certain degree, they have not provided for the removal of the free fatty acids in the oil.

Accordingly, it is an object of this invention to provide an improved method for removing from fat-soluble vitamin-containing marine oils the undesirable color, odor and taste bodies usually associated therewith.

Another object of the invention is to provide a process for removing free fatty acids along with undesirable color, odor and taste bodies from a fat-soluble vitamin-containing marine oil.

The above and other objects may be achieved according to this invention by the treatment of fat-soluble vitamin-containing marine oils with morpholine, its derivatives and/or soaps thereof. For example, in the practice of this invention, a small amount of morpholine is dissolved in the oil whereby the free fatty acids in the oil react with the morpholine to form soaps. Thereafter a sufficient amount of water with or without another polar solvent insoluble in the oil but miscible with the morpholine is added to the mass with agitation to form an aqueous emulsion. The emulsion is then broken whereby the refined oil is released, color, odor and taste bodies being entrained in the soap-water mass. The aqueous phase is removed and the oil is washed to remove any traces of morpholine and soaps thereof.

Various fat-soluble vitamin-containing marine oils may be refined according to this invention including fish liver oils such as cod liver oil, sole liver oil, spearfish liver oil, pollack liver oil, shark liver oil, ling cod liver oil, halibut liver oil, swordfish liver oil, greyfish liver oil, tuna liver oil and the like, and fish oils such as sardine oil, herring oil, salmon oil and the like. Instead of the crude fat-soluble vitamin-containing marine oils, various concentrates or fractions thereof produced by high vacuum distillation, solvent extraction or other like processes may be treated according to the process of the invention to improve the taste, color and odor thereof. Likewise the unsaponifiable fraction of a vitamin-containing marine oil dissolved in a fatty oil or fatty acid may be treated according to the invention.

While morpholine constitutes the preferred organic base to be used in this process any suitable functional derivative thereof, alkyl or aryl derivatives of morpholine such as phenyl morpholine, methyl morpholine, ethyl morpholine, or the like may be employed, as may the soaps of both morpholine and its functional derivatives.

The process of this invention is preferably carried out by mixing with the fat-soluble vitamin-containing marine oil approximately 1½% to 8% of morpholine, a morpholine derivative or a soap of morpholine or its derivatives. The quantity of morpholine, its derivatives or soaps thereof added will depend upon the free fatty acid content of the oil; however, if the oil contains more than 10% of free fatty acids, it is not advisable to remove all of the fatty acids in a single step, but to repeat the process one or more times, removing not more than about 10% (based on the weight of the oil) of fatty acids in each step. In the event that the oil to be treated contains more than 10% free fatty acids, it is advantageous to remove all but about 3% to 10% (based on the weight of the oil) of the free fatty acids by the so-called alkali refining process prior to the treatment of the oil in accordance with the present invention.

When the alkali refining process is used to the foregoing extent, solubilizing of the undesirable color, odor and taste bodies does not take place. In those cases where the oil to be treated contains less than 3% to 5% free fatty acids, a soap of morpholine or its derivatives is preferably added in combination with a quantity of uncombined morpholine or its derivatives. This quantity of morpholine or its derivatives should preferably be in excess of that amount necessary to react completely with the free fatty acids present in the oil. Any suitable soap may be used such as the morpholine or morpholine derivative soaps of oleic, linoleic, stearic, palmitic, lauric, capric, myristic, caprylic, ricinoleic, caproic and the like acids containing at least 8 carbon atoms. It is preferred to employ those soaps which are liquid under atmospheric conditions as they are more readily dissolved in the oil to be treated.

Upon completion of the foregoing step or steps wherein the appropriate quantity of morpholine, morpholine derivatives and/or soaps thereof have been properly admixed with the oil to render the same emulsifiable and substantially devoid of free fatty acids, water is added to form an emulsion of the mass. Approximately 5% to 100% of water (based on the weight of the oil) is added to the oil with agitation. Other polar solvents may be added along with the water including, among others, methanol, ethanol, isopropanol, acetone, diacetone-alcohol and the like. The quantity of such organic polar solvents may comprise 5% to 30% of the water added to effect the formation of the emulsion as aforesaid.

After the formation of an aqueous emulsion of the oil under treatment, the emulsion is broken in any suitable manner. In certain cases the emulsion formed is not too stable so that it will break upon standing, and in other cases positive steps will be necessary to effect breaking. It is preferred to break the emulsion by mechanical rather than chemical means, one of the preferred means being by centrifugation. In the process of breaking, the emulsion should preferably be maintained in a fluid condition to accelerate the separation of the two phases. Fluidity of the emulsion may be maintained by heat, the degree of which should not be greater than necessary. In practice temperatures ranging from about 20° C. to 90° C. have been found to be sufficient in obtaining fluid emulsions. During the breaking of the emulsion the moropholine or morpholine derivative soaps serve to entrain or occlude color, odor and taste bodies, thus freeing the oil thereof. Upon completion of the breaking step the mass separates into two layers, one of oil and the other of the aqueous phase containing the soaps, unspent morpholine or its derivatives, any added polar organic solvents, nitrogenated and oxygenated impurities (color, odor and taste bodies) and water. The layers are separated and the oil washed with water and/or polar organic solvents immiscible with the oil to remove any soap, water, morpholine or its derivatives from the oil.

It has been discovered in the practice of this invention that a large measure of the purifying action is due to the morpholine soaps formed from fatty acids in the vitamin oils. In some cases the oil to be treated will contain little or no free fatty acids. In such cases, therefore, it has been found advantageous either to add a certain amount of fatty acid thereto; or to employ morpholine soaps instead of, or in conjunction with, morpholine in purifying fat-soluble vitamin-containing marine oils according to this invention.

For a fuller understanding of the nature and objects of the invention, reference should be had to the following examples which are given merely to further illustrate the invention and are not to be construed in a limiting sense, all parts given being by weight.

Example I 100 parts of crude shark liver oil containing 100,000 U. S. P. units of vitamin A per gram and 3% of free fatty acids were mixed with 2 parts of morpholine, and the mixture stirred until a clear solution resulted. 10 parts of water were added, and the mixture again stirred to form an emulsion. The mixture was then centrifuged to break this emulsion and the oily layer washed with 10 part portions of water. The oily layer was then removed and dried. The resultant oil was completely devoid of free fatty acids, was lighter in color than the original oil and was devoid of the original fishy taste and odor. The vitamin A content of the oil did not decrease during the process.

Example II 100 parts of shark liver oil containing 275,000 U. S. P. units of vitamin A per gram and 5.75% of free fatty acids were mixed with 3 parts of morpholine, and the mixture thoroughly agitated. 20 parts of water and 2 parts of ethanol were added and the mixture slowly agitated. On standing, two layers formed; the upper (oil) layer was removed, washed twice with 20 part portions of water and then dried under reduced pressure. The treated oil contained less than 0.2% free fatty acids and was greatly improved in taste and odor. The vitamin A potency of the refined oil was 283,000 U. S. P. vitamin A units per gram.

Example III 200 parts of greyfish liver oil containing 12,000 U. S. P. units vitamin A per gram and 4.0% free fatty acids and having a strong fishy taste and odor were mixed with 5.0 parts of morpholine, and the mixture stirred to insure complete solution. 50 parts of water were added and the mixture was thoroughly agitated. The mixture was then centrifuged to separate the oil, which, when removed, was found to be devoid of fishy taste and odor, was lighter in color than the original oil, and contained 0.3% free fatty acids. The vitamin A potency was unchanged.

Example IV 100 parts of tuna liver oil containing 67,000 U. S. P. units of vitamin A, 20,000 U. S. P. units of vitamin D per gram and 0.2% free fatty acids and possessing a distinct fishy taste and odor were thoroughly mixed with 5 parts of morpholine oleate containing 20% free morpholine. A clear solution resulted. 40 parts of water were added and the mixture agitated for 15 minutes; a temporary emulsion resulted. The mixture was then centrifuged to break the emulsion and a clear oil layer and an aqueous layer resulted. The oil layer was washed three times with 40 part portions of water and then subjected to a reduced pressure in the presence of $N_2$ gas at about 60° C. for 30 minutes to remove all traces of moisture. The treated oil was bland in taste, odorless and contained less than 0.1% free fatty acids. The vitamin potency was unchanged.

Example V 100 parts of a high vitamin A oil containing 276,000 U. S. P. units of vitamin A per gram and 5.7% free fatty acids, which oil was produced from shark liver oil by solvent extraction and possessed a strong fishy taste and odor, were thoroughly mixed with 6 parts of morpholine. A clear solution resulted. 20 parts of water were then added and the mixture again agitated thoroughly. A temporary emulsion resulted. The mixture was then centrifuged to recover a clear oil phase. The recovered oil was washed twice with 20 part portions of water, and then subjected to reduced pressure at about 60° C. for 30 minutes to remove all traces of moisture. The resulting oil was much lighter in color than the original oil, was devoid of fishiness and contained less than 0.5% free fatty acids. The vitamin A content was unchanged.

It will be seen from the foregoing examples that there is provided by this invention a process for refining fat-soluble vitamin-containing marine oils and greatly improving the taste and odor thereof which does not destroy any of the vitamins contained in the oils, since in each example the vitamin content remained undiminished. It will be seen further that processes according to this invention may be more expeditiously carried out than any earlier procedures involving the extraction of oils with amine extractants.

Having described our invention what we claim as new and desire to secure by Letters Patent is:

1. A process of removing undesirable color, odor and taste bodies from fat-soluble vitamin-containing marine oils which comprises admixing one or more of the compounds selected from the group consisting of morpholine, morpholine functional derivatives and soaps thereof with a fat-soluble vitamin-containing marine oil, admixing water with the mass to form an emulsion thereof and breaking the emulsion to separate refined oil therefrom.

2. A process of removing undesirable color, odor and taste bodies from fat-soluble vitamin-containing marine oils which comprises admixing one or more of the compounds selected from the group consisting of morpholine, morpholine functional derivatives and soaps thereof with a fat-soluble vitamin-containing marine oil, admixing water containing 5% to 30% of a water-miscible polar organic solvent with the mass to form an emulsion thereof and breaking the emulsion to separate refined oil therefrom.

3. A process of removing undesirable color, odor and taste bodies from fat-soluble vitamin-containing marine oils which comprises saponifying free fatty acids in a fat-soluble vitamin-containing marine oil with morpholine, emulsifying the resulting mass in an aqueous medium, breaking the emulsion and separating the refined oil from the aqueous phase.

4. A process of removing undesirable color, odor and taste bodies from fat-soluble vitamin-containing marine oils which comprises admixing a fat-soluble vitamin-containing marine oil containing 3% to 10% free fatty acids with at least the stoichiometrical quantity of morpholine necessary to completely saponify the free fatty acids, emulsifying the resulting mass in an aqueous medium and breaking the emulsion to separate refined oil therefrom.

5. A process of removing undesirable color, odor and taste bodies from fat-soluble vitamin-containing marine oils which comprises saponifying free fatty acids in a fish liver oil with morpholine, emulsifying the resulting mass in an aqueous medium, breaking the emulsion and separating the refined oil from the aqueous phase.

6. A process of removing undesirable color, odor and taste bodies from fat-soluble vitamin-containing marine oils which comprises admixing a fish liver oil containing 3% to 10% free fatty acids with at least the stoichiometrical quantity of morpholine necessary to completely saponify the free fatty acids, emulsifying the resulting mass in an aqueous medium and breaking the emulsion to separate refined oil therefrom.

LORAN O. BUXTON.
LOUIS T. ROSENBERG.